United States Patent
Li et al.

(10) Patent No.: US 11,108,599 B1
(45) Date of Patent: Aug. 31, 2021

(54) METHOD AND APPARATUS FOR FREQUENCY DOMAIN EQUALIZATION WITH LOW COMPLEXITY AND LOOP DELAY

(71) Applicants: Chuandong Li, Ottawa (CA); Jianhong Ke, Ottawa (CA)

(72) Inventors: Chuandong Li, Ottawa (CA); Jianhong Ke, Ottawa (CA)

(73) Assignee: Huawei Technologies Co. Ltd., Shenzhen (CN)

( * ) Notice: Subject to any disclaimer, the term of this patent is extended or adjusted under 35 U.S.C. 154(b) by 0 days.

(21) Appl. No.: 16/936,098

(22) Filed: Jul. 22, 2020

(51) Int. Cl.
*H04L 25/03* (2006.01)
*H04B 10/61* (2013.01)

(52) U.S. Cl.
CPC ..... *H04L 25/03159* (2013.01); *H04B 10/613* (2013.01); *H04B 10/616* (2013.01)

(58) Field of Classification Search
CPC ............ H04B 10/613; H04B 10/616; H04L 25/03159
USPC ........................................................ 398/202
See application file for complete search history.

(56) References Cited

U.S. PATENT DOCUMENTS

| | | | |
|---|---|---|---|
| 10,554,309 B2 * | 2/2020 | Millar | H04L 7/0029 |
| 10,594,406 B2 * | 3/2020 | Zhu | H04B 10/6165 |
| 2005/0207334 A1 * | 9/2005 | Hadad | H04L 25/03057 370/203 |
| 2010/0296556 A1 | 11/2010 | Rave et al. | |
| 2012/0148255 A1 * | 6/2012 | Liu | H04B 10/50 398/136 |
| 2014/0010532 A1 * | 1/2014 | Zhang | H04B 10/61 398/25 |
| 2019/0222321 A1 | 7/2019 | Millar et al. | |
| 2020/0382235 A1 * | 12/2020 | Matsuda | H04B 10/6166 |
| 2020/0413168 A1 * | 12/2020 | Han | H04Q 11/0066 |

FOREIGN PATENT DOCUMENTS

| | | |
|---|---|---|
| CN | 109845144 A | 6/2019 |
| WO | 2007096799 A1 | 8/2007 |

OTHER PUBLICATIONS

John N. Shynk, 'Frequency-domain and Multirate Adaptive Filtering', IEEE SP magazine, pp. 14-37 Jan. 1992.

* cited by examiner

*Primary Examiner* — Dalzid E Singh

(57) ABSTRACT

Methods and devices are described for frequency domain equalization with low complexity and loop delay. A transmitter inserts pilot symbols into a data signal at intervals of every n data bits. These pilot symbols are used by a receiver-side frequency-domain equalizer to calculate error levels and equalize the received data signal to effect impairment compensation such as SOP tracking. QPSK or BPSK symbols may be used for the pilot symbols, simplifying error calculation into an addition operation instead of the conventional multiplication operation required by conventional FDEQs. Equalizers are described that may operate in a pilot-assisted mode, a conventional decision-directed mode, or both.

19 Claims, 10 Drawing Sheets

METHOD AND APPARATUS FOR FREQUENCY DOMAIN EQUALIZATION WITH LOW COMPLEXITY AND LOOP DELAY

RELATED APPLICATIONS

This is the first patent application related to this matter.

FIELD

The present disclosure is related to methods and devices for signal equalization, and in particular to methods and devices for performing frequency domain equalization with low complexity and loop delay.

BACKGROUND

Signals transmitted over wireless, wired, or optical channels are subject to various linear and non-linear impairments. In order to compensate for these linear and non-linear impairments, various coherent receivers are configured to perform coherent detection together with digital signal processing.

Digital signal processing may include fixed and adaptive equalization to compensate for linear impairments. Adaptive equalizers may mainly compensate time-varying adaptive impairments, such as polarization mode dispersion (PMD), state of polarization (SOP) tracking, and also polarization division de-multiplexing, residual chromatic dispersion (CD), mitigation of inter-symbol interference (ISI), etc. Adaptive equalizers conventionally implement a butterfly configuration which is often referred to a 2×2 MIMO (multiple input multiple output). Equalization can be performed in the time domain as well as the frequency domain. However, time-domain equalization may occupy a large portion of overall digital signal processing complexity, especially in implementations with a large number of equalizer taps. One solution to reduce complexity is to use a frequency-domain equalizer (FDEQ) implementing a block-by-block updating strategy and efficient implementation of a discrete Fourier transform (DFT) operation.

In certain applications, however, even the complexity required by a FDEQ is a major concern. Furthermore, the FDEQ may incorporate a carrier recovery path in its equalization loop and may require a large number of error calculations, both of which may introduce significant delay into the equalization loop, resulting in slower or less effective equalization.

Therefore, there is a need for frequency domain equalization that overcomes one or more of the limitations of the prior art.

SUMMARY

In various embodiments described herein, methods and devices are disclosed that provide frequency domain equalization with low complexity and loop delay for fast SOP tracking. Various embodiments may include a transmitter for inserting pilot symbols into a data signal at the transmitter at intervals of every n data bits: a pilot symbol is inserted after every n−1 data symbols, such that a data block of N symbols contains N−k data symbols and k pilot symbols, wherein N=nk. These pilot symbols are used by a receiver-side frequency-domain equalizer in some embodiments to calculate error levels and equalize the received data signal for impairment compensation. Because error calculations are performed on only k out of every N symbols, the calculations are significantly faster and the equalization loop delay may be significantly decreased. Furthermore, by using pilot symbols to calculate error levels, the equalizer may eliminate the need to include a carrier recovery path in the equalization loop, further reducing loop delay. A loop delay spanning multiple equalization cycles may impair the SOP tracking ability of an equalizer; in some scenarios involving fast variation, the loop delay has to be relatively short in order to effectively track SOP. Some embodiments use quadrature-phase shift keying (QPSK) or bit-phase shift keying (BPSK) symbols for the pilot symbols, simplifying error calculation into an addition operation instead of the conventional multiplication operation required by conventional FDEQs. Thus, by reducing the complexity and loop delay of the equalizer, the SOP tracking ability may be improved.

The claims make reference to various signal values and calculated values using mathematical symbols such as X, W, $E_{pilot}$, E, N, n, k, m, p, and $\Delta \varphi$. Such references are not intended to be limited to the specific values described in the specification with reference to particular embodiments, but are instead intended to clarify the scope of the claims with reference to other claim elements and to simplify the presentation of equations and formulae within the claims.

As used herein, the term "update" or "updating" may refer to any process by which a signal value is replaced with a new or different signal value. In some cases such updating may be performed by perturbing, offsetting, modulating, incrementing, or otherwise modifying an existing signal value to achieve a new or updated signal value. In other cases such updating may be performed by replacing an existing signal value or setting a new or updated signal value. In particular, equalizers described herein are described as updating equalizer tap values. An equalizer tap may be any location or component of a circuit or device at which a signal may be tapped and provided as an input to a further component. The signal present at the equalizer taps may be regarded as an equalization signal used to equalize a data signal received by the equalizer to compensate for impairments. The value of the equalizer signal at an equalizer tap may be "updated", for example, by replacing the current value with a new value calculated based on a block of error data, as described herein. The equalizer tap may in turn "update" a data signal to an equalized version of the data signal, for example, by using a signal multiplier to multiply the data signal by the equalization signal (i.e. one or more tap values) to generate an equalized version of the data signal. Thus, in some cases "updating" may refer to replacing, while in other cases it may refer to generating a new signal based on the previous signal.

As used herein, a statement that an element is "for" a particular purpose may mean that the element performs a certain function or is configured to carry out one or more particular steps or operations, as described herein.

As used herein, statements that a second signal or value is "based on" a first signal or value may mean that characteristics of the second signal or value are affected or determined at least in part by characteristics of the first signal or value. The first signal or value may be considered an input to an operation or calculation, or a series of operations or calculations, that produces the second signal or value as an output that is not independent from the first signal or value.

In some aspects, the present disclosure describes a device. The device comprises a coherent receiver for receiving an optical signal and generating an electrical signal based on the optical signal. The optical signal comprises a plurality of pilot symbols and a plurality of data symbols. The device further comprises a frequency-domain adaptive equalizer (FDEQ) configured to receive a digital signal based on the electrical signal. The FDEQ comprises an equalization path comprising one or more equalizer taps for equalizing the digital signal in the frequency domain using one or more taps values W based on a pilot error signal $E_{pilot}$, thereby generating an equalized digital signal. The FDEQ further comprises a pilot error tap update path for generating the pilot error signal $E_{pilot}$ by calculating a phase angle $\Delta\varphi$ based on the angle between one or more predetermined pilot symbols and one or more received pilot symbols of the equalized digital signal, and updating the equalizer taps based on the pilot error signal $E_{pilot}$ according to a pilot error update interval.

According to a further aspect, the present disclosure provides a method. A digital signal is received, comprising a plurality of pilot symbols and a plurality of data symbols. One or more equalizer taps are used to equalize the digital signal in the frequency domain using one or more tap values W based on a pilot error signal $E_{pilot}$, thereby generating an equalized digital signal. The pilot error signal $E_{pilot}$ is generated by calculating a phase angle $\Delta\varphi$ based on the angle between one or more predetermined pilot symbols and one or more received pilot symbols of the equalized digital signal. The equalizer taps are updated based on the pilot error signal $E_{pilot}$ according to a pilot error update interval.

In some examples, the method further comprises receiving an optical signal at a coherent receiver, the optical signal comprising a plurality of pilot symbols and a plurality of data symbols, and generating a digital signal based on the optical signal.

In some examples, the device further comprises a decision error tap update path comprising a carrier recovery path for generating a phase-compensated decision signal based on the equalized digital signal, the decision error tap path being configured to generate a decision error signal E based on the difference between the equalized digital signal and the phase-compensated decision signal, and update the equalizer taps based on the decision error signal E according to a decision error update interval. The pilot error update interval is shorter than the decision error update interval. The tap values W are also based on the decision error signal E.

In some examples, the device is configured to selectively activate and deactivate the decision error tap update path.

In some examples, the device is configured to selectively activate and deactivate the pilot error tap update path.

In some examples, the device is configured to deactivate the decision error tap update path after the equalizer is locked.

In some examples, the device is further configured to update the equalizer taps using the decision error tap update path, with the pilot error tap update path deactivated, until the equalizer is locked, and activate the pilot error tap update path after the equalizer is locked.

In some examples, the method further comprises updating the equalizer taps based on the decision error signal E until the equalizer is locked, and updating the equalizer taps based on the pilot error signal $E_{pilot}$ after the equalizer is locked.

In some examples, the method further comprises updating the equalizer taps based on the decision error signal E and the pilot error signal $E_{pilot}$ until the equalizer is locked, and updating the equalizer taps based on the pilot error signal $E_{pilot}$ after the equalizer is locked.

In some examples, the equalizer further comprises a conjugation path for generating a conjugate signal X* of the digital signal in the frequency domain, X. The pilot error tap update path is configured to update the equalizer taps at pilot error time interval p by generating a gradient signal by multiplying the pilot error signal $E_{pilot}$ at previous pilot time interval (p−1) by the conjugate signal X* at previous pilot time interval (p−1), applying a gradient constraint G{.} to the gradient signal to generate a constrained gradient signal, multiplying the constrained gradient signal by two times a pilot error step size $\rho_{pilot}$ to generate a step-scaled signal, adding the step-scaled signal to equalizer taps values W(p−1) from a previous pilot time interval (p−1) stored by one or more delay units to generate one or more updated tap values W(p), and updating the equalizer taps with the updated tap values W(p) at pilot error time interval p such that W(p)=W(p−1)+2$\rho_{pilot}$G{$E_{pilot}$(p−1)X(p−1)*}.

In some examples, the equalizer further comprises a conjugation path for generating a conjugate signal X* of the digital signal in the frequency domain X. The decision error tap update path is configured to update the equalizer taps at decision error time interval m by generating a decision error gradient signal by multiplying the decision error signal E at previous decision time interval (m−1) by the conjugate signal X* at previous decision time interval (m−1), applying a gradient constraint G{.} to the decision error gradient signal to generate a constrained decision error gradient signal, and multiplying the constrained decision error gradient signal by two times a decision error step size p to generate a decision error step-scaled signal. The pilot error tap update path is configured to update the equalizer taps at pilot error time interval p by generating a pilot error gradient signal by multiplying the pilot error signal $E_{pilot}$ at previous pilot time interval (p−1) by the conjugate signal X* at previous pilot time interval (p−1), applying a gradient constraint G{.} to the pilot error gradient signal to generate a constrained pilot error gradient signal, multiplying the constrained pilot error gradient signal by two times a pilot error step size $\mu_{pilot}$ to generate a pilot error step-scaled signal, adding the pilot error step-scaled signal and the decision error step-scaled signal to tap values W(p−1) from a previous pilot time interval (p−1) stored by one or more delay units to generate one or more updated tap values W(p), and updating the equalizer taps with the updated tap values W(p) at pilot error time interval p such that W(p)=W(p−1)+2$\mu_{pilot}$G{$E_{pilot}$(p−1)X(p−1)*}+2 $\mu$G{E(m−1)X(m−1)*}.

In some examples, the pilot symbols of the optical signal are either quadrature phase shift keying (QPSK) symbols or binary phase shift keying (BPSK) symbols, and calculating the phase angle $\Delta\varphi$ comprises an addition operation.

In some examples, the pilot error tap update path generates the pilot error signal $E_{pilot}$ by performing several steps. The pilot error tap update path receives a data block of N symbols of the equalized digital signal, the N symbols comprising k received pilot symbols distributed at regular intervals between every (n−1) data symbols, wherein kn=N. The pilot error tap update path calculates the phase angle $\Delta\varphi$ as the sum of, for each of the k pilot symbols, the angle between a predetermined pilot symbol and the corresponding received pilot symbol of the data block, wherein N=kn. The pilot error tap update path generates an error block of k symbols, wherein each symbol is the difference between one of the k predetermined pilot symbols adjusted by the phase angle $\Delta\varphi$, and one of the corresponding k received pilot symbols. The pilot error tap update path concatenates the error block with a zero block of k zero-value symbols. The pilot error tap update path applies a Fourier transform to transform the concatenated error block and zero block to the frequency domain to generate a frequency-domain block of 2k symbols. The pilot error tap update path duplicates the frequency-domain block n times to generate a block of the error signal $E_{pilot}$ of 2N symbols.

According to a further aspect, the present disclosure provides a device. The device comprises a coherent transmitter for transmitting an optical signal comprising a plurality of pilot symbols and a plurality of data symbols such that, for every data block of N symbols of the optical signal, the N symbols comprise k pilot symbols distributed at regular intervals between every (n−1) data symbols, wherein kn=N.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In examples disclosed herein, methods and apparatuses are described that provide frequency domain equalization with low complexity and loop delay. Pilot symbols are inserted into a data signal at the transmitter at intervals of every n data bits: a pilot symbol is inserted after every n−1 data bits, such that a data block of N bits contains N−k data bits and k pilot symbols, wherein N=nk. Each pilot symbol has predetermined characteristics, e.g. a predetermined phase rotation. As used in the context of the pilot symbols, the term "predetermined" shall mean that a transmitter and a receiver share a mutual representation of pilot symbol characteristics prior to generation and transmission of a signal including pilot symbols by the transmitter to the receiver. These pilot symbols are used by a receiver-side frequency-domain equalizer to calculate error levels and equalize the received data signal to effect impairment compensation such as state of polarization (SOP) tracking. The predetermined characteristics of the pilot symbols are compared to the characteristics of the received pilot symbols to determine phase distortions introduced in transmission, including frequency offset and phase noise. The errors are then obtained by calculating the difference between the predetermined pilot symbols after rotating the same amount of the phase angle and the received pilot symbols. Because error calculations are performed on only k out of every N bits, the calculations are significantly faster and the equalization loop delay may be significantly decreased. Furthermore, by using pilot symbols to calculate error levels, the equalizer may eliminate the need to include a carrier recovery path in the equalization loop, further reducing loop delay. If the pilot symbols are quadrature-phase shift keying (QPSK) or bit-phase shift keying (BPSK) symbols, error calculation may be simplified into an addition operation instead of the conventional multiplication operation required by conventional FDEQs.

Figure 1:
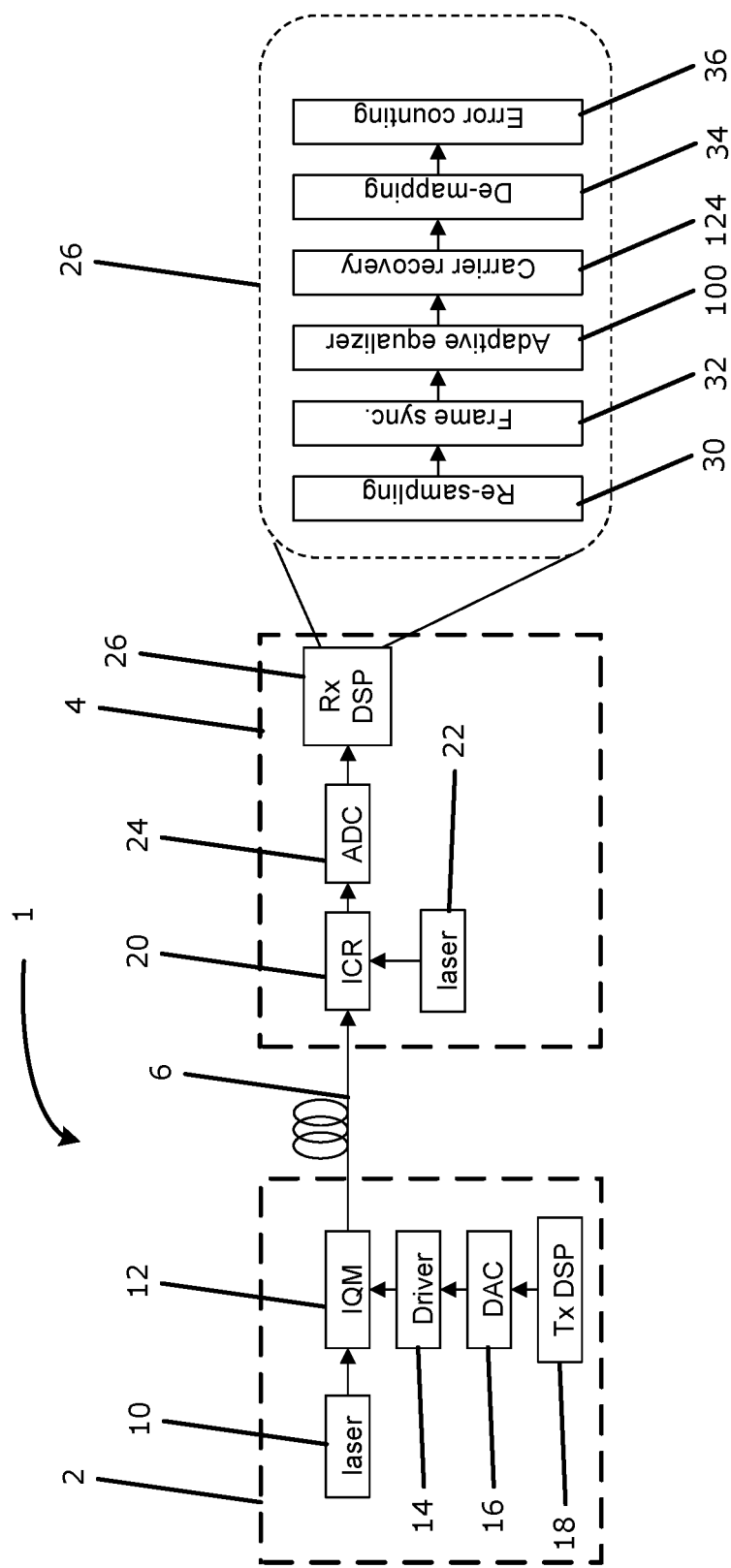
FIG. 1 (Prior Art) is a high-level block diagram of a conventional coherent system showing a more detailed block diagram of the receiver digital signal processor (DSP) including an adaptive equalizer.

FIG. 1 (Prior Art) is a high-level block diagram of a conventional coherent system 1 showing a more detailed block diagram of the receiver digital signal processor (DSP) including an adaptive equalizer. As shown, coherent system 1 includes a transmitter 2 comprising a transmitter DSP 18, a digital to analog convertor (DAC) 16, a driver 14, an in-phase quadrature modulator (IQM) 12, and a first laser 10. The coherent system 1 also includes an optical link (such as a fiber link) 6 and a receiver 4. The receiver 4 comprises a coherent receiver (such as an integrated coherent receiver (ICR)) 20, a second laser 22, an analogue to digital convertor (ADC) 24, and a receiver DSP 26. It will be appreciated that other elements may be present but not illustrated for the purpose of simplicity.

The transmitter DSP 18 is configured to receive a digital signal and perform up-sampling and pre-compensation of the received digital signal. The DAC 16 is configured to convert the up-sampled and pre-compensated digital signal to an analog signal. The analog signal is amplified by the driver 14. The amplified analog signal is then modulated to the output of the first laser 10 via IQM 12 to convert the amplified analog signal into an optical signal having an X-polarization channel and a Y-polarization channel.

The X- and Y-polarized channels of the optical signal are transmitted through fiber link 6. It will be appreciated that the conventional coherent system 1 is configured to transmit an optical signal, but in other conventional coherent systems may transmit the analog signal as a radio frequency signal in a wireless medium. The transmitted signal, whether optical or radio frequency, is subject to various linear and non-linear impairments.

The X- and Y-polarized channels of the optical signal are detected by ICR 20 with a local oscillator that includes second laser 22. In so doing, the ICR 20 converts the optical signal to X- and Y-polarized electrical signal channels. The ADC 24 is configured to convert the X- and Y-polarized electrical signal channels to X- and Y-polarized digital signal channels. The X- and Y-polarized digital signal channels are then forwarded to the receiver DSP 26 for various digital signal processing measures, including impairment compensation such as SOP compensation.

The receiver DSP 26 further includes a re-sampling block 30, a frame synchronization block 32, an adaptive equalizer 100, a carrier recovery module 124, a de-mapping module 34, and an error calculator 36. It will be appreciated that other elements may be present but not illustrated for the purpose of simplicity.

The adaptive equalizer 100 is configured to compensate for time-varying adaptive impairments such as polarization mode dispersion (PMD), polarization division de-multiplexing, state of polarization (SOP) tracking, residual chromatic dispersion (CD), and mitigation of inter-symbol interference. The carrier recovery module 124 is configured to provide frequency offset compensation to the time-varying adaptive impairments compensated digital signal channels in X-polarization and Y-polarization. The carrier recovery module 124 is further configured to recover the phase of a carrier signal from the time-varying adaptive impairments compensated digital signal. The de-mapping module 34 is configured to convert the carrier recovered X- and Y-polarized digital signal channels into bits, and the error calculator 36 is configured to compute bit error rate (BER) in the bits. In some configurations, the carrier recovery module 124 may be integrated with the adaptive equalizer 100 to provide carrier signal information to assist with the operation of the adaptive equalizer 100, as will be described in greater detail below with reference to FIG. 2.

Figure 2:
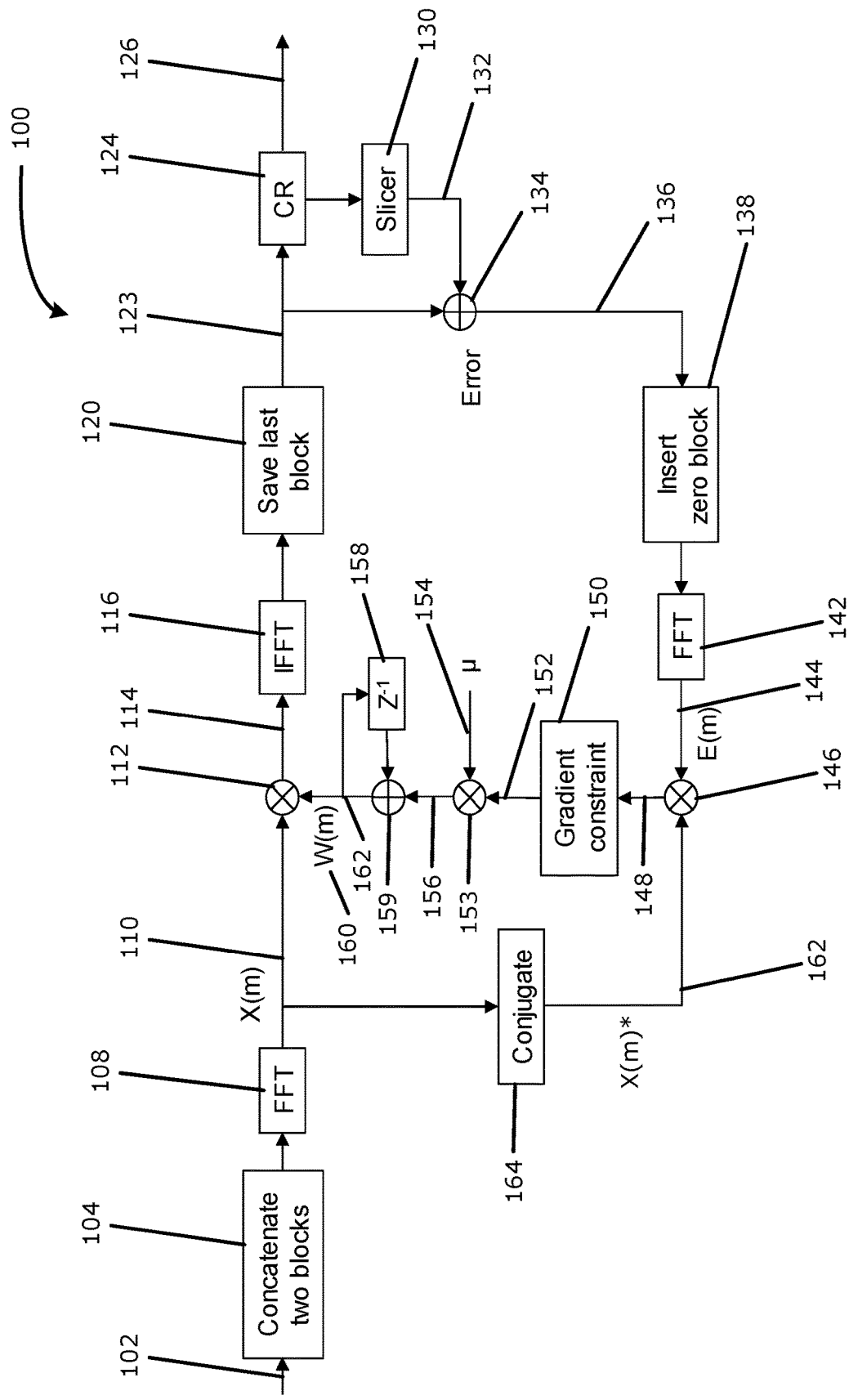
FIG. 2 (Prior Art) is a block diagram of a conventional frequency-domain equalizer (FDEQ) including a carrier recovery path.

FIG. 2 (Prior Art) is a block diagram of a conventional adaptive equalizer 100 as a decision-directed frequency-domain equalizer (FDEQ), including a carrier recovery path that integrates the carrier recovery module 124. The equalizer 100 will be described as either a polarization-multiplexed equalizer configured to equalize input signals having X- and Y-polarized channels, or a single-polarization equalizer configured to equalize single-polarization input signals. It will be appreciated that most of the operations of a polarization-multiplexed FDEQ involve repeating the same steps for both polarization components, even where not explicitly described as doing so; however, updating the equalization taps may involve a more complex interaction between the two polarization components. Furthermore, different polarization components of a data signal (e.g., an X-polarized component or a Y-polarized component) may be referred to as "channels", regardless of whether they coexist within a common transmission medium or in separate physical transmission channels.

A conventional FDEQ such as adaptive equalizer 100 is described by John N. Shynk, 'Frequency-domain and Multirate Adaptive Filtering', IEEE SP magazine, pp 14-37, January 1992, which is hereby incorporated by reference in its entirety.

The equalizer 100 receives a digital data signal 102, as input, e.g., from the Frame Sync block 32 of the receiver DSP 26. The digital data signal 102 is a time-domain digital signal at the equalizer input stage.

A concatenation module 104 is configured to concatenate data samples (i.e. symbols) of the (time-domain) digital data signal 102. If polarization-multiplexed, the concatenation module 104 concatenates symbols from both X- and Y-polarized channels. For example, the concatenation module 104 concatenates the $m^{th}$ block of most recent X-polarized N data samples with a previous block (i.e. the $(m-1)^{th}$ block) of X-polarized N data samples of the digital data signal 102. Similarly, the concatenation module 104 concatenates the $m^{th}$ block of most recent Y-polarized N data samples with a previous block of Y-polarized N data samples of the digital data signal 102. Hence, the overall length of the $m^{th}$ block of the digital data signal 102 is 2N; if polarization-multiplexed, the length of each of the X- and Y-polarized channels of the digital data signal 102 is 2N.

A fast Fourier transform (FFT) module 108 performs a discrete 2N point fast Fourier transform operation to transform the block of data samples of the (time-domain) digital data signal 102 to the frequency domain. The block of symbols may now be represented as data signal X(m) 110 in a single-polarization equalizer, or as data channels X(m) and Y(m) in a polarization-multiplexed equalizer. As used herein, m is used as an index to differentiate sequential blocks of the data signal. Each block of the data signal is equalized by the equalizer taps using a new, updated set of tap values. Thus, the time period between data block m and data block m+1 determines the throughput of the equalizer. This time period may also be referred to as the "tap update interval", because the taps are updated in between each equalization of a data block. Thus, at every index m indicating a single tap update interval, a new data block is equalized by the equalizer 100: data signal block X(m−1) is equalized during time interval index (m−1), then data signal block X(m) is equalized during time interval index m, and so on. The tap update interval of decision-directed FDEQ 100 may be referred to herein as a tap update time interval based on decision error, or a "decision error tap update interval" for short, referring to the time interval between equalization operation of the decision-directed equalizer 100 equalizing a block of the data signal and the time required for updating the taps 162. As used herein, tap values W(m) 160 refer to tap values calculated based on data signal X(m−1) 110. As noted above, the tap values 160 may represent an equalization signal used to equalize a data signal (e.g., digital data signal 102). The tap values 160 may be represented by the symbol W, and the tap values 160 at a specific time interval may be represented as W(m), W(p), and so on. The use of the symbol W is arbitrary and does not indicate the use of any particular mathematical function, such as a Lambert W function; the calculation of the tap values W 160 is described in detail herein.

The loop delay of the equalizer 100 introduces latency into the tap updating process. The tap update path of the equalizer 100 may take a long time to update the tap values 160; this loop delay may correspond to any number of update intervals, such as 10 or 20 update intervals. Thus, by the time the taps 162 are updated with tap values 160 based on equalized data block (m−1), the taps 162 may be applying this updated tap value W(m) 160 to data block (m+10) or (m+20). This longer time interval may be variously referred to herein as "loop delay", "equalizer latency", or "tap update latency". The decision-directed FDEQ 100 is generally configured such that the decision error tap update interval corresponds to a fixed fraction of the loop delay, such that a fixed number of data blocks are equalized during every period of tap update latency. The number of data blocks equalized during a single period of tap update latency may be indicated by L, such that tap values W(m) 160 are used to equalize data block (m+L).

A multiplier 112 multiplies a set of equalization tap values W(m+L) 160 of equalizer taps 162 by the mu' block of (frequency-domain) data signal X(m) 110 to generate equalized signal 114. The taps 162 may be 2×2 MIMO taps as described above. The equalizer taps values W(m) 160 are used to compensate for time-varying adaptive impairments such as SOP tracking. If polarization-multiplexed, equalization tap values W(m) 160 may comprise four different components $W_{xx}(m)$, $W_{yx}(m)$, $W_{xy}(m)$, and $W_{yy}(m)$. Calculation of the tap values W(m) 160 is performed by various components of the tap update path of the equalizer 100 as described below. Typically, a FDEQ 100 will have a number of taps 162 equal to the number of symbols in a block of the digital data signal 102 to be equalized in a single multiplication by the multiplier 112, i.e., in this example, 2N equalizer taps 162.

To generate equalized (frequency domain) digital data signal 114, the multiplier 112 updates X 110 to X=X·W. If polarization-multiplexed, X=X·W$_{xx}$+Y·W$_{yx}$ and Y=X·W$_{xy}$+Y·W$_{yy}$. Equalized digital data signal 114 is provided to an inverse fast Fourier transform (IFFT) module 116, which performs a discrete 2N point inverse fast Fourier transform to transform the equalized digital data signal 114 to the time domain. A save last block module 120 discards the previous N symbols of the data block (corresponding to the m−1$^t$ block) to generate an m$^{th}$ data block 123 of N symbols of the equalized digital data signal 114 in the time domain, also called equalized data block 123. If polarization-multiplexed, N symbols are discarded from each of the X and Y channel blocks.

A carrier recovery module 124 performs frequency offset compensation and phase noise mitigation on equalized data block 123, generating a phase-compensated decision signal 132 using a slicer 130. An adder 134 subtracts the output of the save last block module 120 from the phase-compensated decision signal 132 (representing a desired response) to generate a time domain error signal 136. It will be appreciated that the length of the time domain error signal is N. The N-symbol block of the equalized digital data signal in the time domain passes through the carrier recovery block 124 as the carrier recovery output signal 126.

The time domain error signal 136 is provided to insert zero block 138. The insert zero block 138 is configured to add a block of N zeros to the time domain error signal 136 in order to generate a time domain error signal block of length 2N. A second FFT module 142 performs a discrete 2N point fast Fourier transform to convert the 2N-symbol time domain error signal block into the frequency domain, thereby generating error signal E(m) 144. If polarization-multiplexed, X and Y channels each have a block of N zero bits added and each channel is transformed to the frequency domain, with E(m) 144 representing channels E$_x$(m) and E$_y$(m) for the X-polarization and Y-polarization channels respectively. The error signal E(m) 144 is provided to a second multiplier 146.

A conjugation module 164 receives the digital data signal block X(m) 110 in the frequency domain generates a conjugate signal X(m)* 162 which is a complex conjugate of the digital data signal X(m) 110. The conjugate signal X(m)* 162 is provided to the second multiplier 146. As used herein, a conjugated version of a signal, such as signal X(m), may be represented as either X*(m) or X(m)*. An asterisk (*) following a signal signifier (such as X or X(m)) shall indicate a conjugated version of such a signal.

The second multiplier 146 multiplies the conjugate signal X(m)* 162 and the error signal E(m) 144 to generate a gradient signal 148. The gradient signal 148 is provided to a gradient constraint unit 150 configured to apply a gradient constraint G{.} to the gradient signal 148. Typically, the gradient constraint unit 150 performs IFFT on the received data samples having a length of 2N, deletes the last N samples of the time domain received data samples, adds a block of N zeroes, and performs 2N point FFT to gradient constraint G{.} to generate a constrained gradient signal 152.

The constrained gradient signal 152 is multiplied by two times a step size μ 154 by a third multiplier 153 to generate a step-scaled signal 156. The step-scaled signal 156 is then added to a previous set of tap values W stored in delay units 158, i.e. W(m−1), by second adder 159. The output of second adder 159 is the updated tap values W(m) 160. The delay units 158 are shown as one-interval delay units in FIG. 2; the delay units 158 provide the previous value of the equalization taps 162 for updating the current values W(m) 160 of the equalization taps 162 using the tap values W from the previous decision error update interval (m−1), indicated as W(m−1). Typically, the conventional FDEQ 100 will have a number of delay units 158 equal to the number of equalizer taps 162, i.e. 2N delay units 158 in this example. The time delay of each delay unit 158 is the update interval of the equalizer 100, i.e. the decision error tap update interval in this example.

The example conventional decision-directed equalizer 100 may thus be characterized as comprising two paths used for equalizing the digital data signal 102. The first of path is an equalization path constituting the concatenation module 104, FFT module 108, 2×2 MIMO equalizer taps 162, multiplier 112, IFFT module 116, and save last block module 120. The equalization path thus takes the (time domain) digital signal 102 as input and generates the equalized (time domain) digital signal 123 as output. The second path is a tap update path for updating the values 160 of the taps 162, in this example called a decision error tap update path (because the taps are updated using a decision-directed error calculation process). The decision error tap update path receives the equalized data block 123 as one of its inputs and generates the updated tap values 160 as output. The decision error tap update path includes the components used to update the equalizer tap values W 160, such as adder 134, insert zero block 138, FFT 142, second multiplier 146, gradient constraint unit 150, third multiplier 153, second adder 159, and delay units 158. The equalizer also has a carrier recovery path passing through the carrier recovery module 124 and slicer 130, and a conjugation path passing through the conjugation module 164. However, because the decision error tap update path is dependent upon the outputs of these two paths and incorporates their outputs into its calculations prior to updating the taps 162, the carrier recovery path and conjugation path may be considered to be part of the decision error tap update path. It will thus be appreciated that the term "path" does not refer to a single linear data propagation path, but may include all the operations necessary to generate the outputs of the path based on the inputs to the path, including operations arranged in parallel or operations receiving additional inputs (such the pre-equalized digital signal block 110 received as input by the conjugation path). It will also be appreciated that the tap update path, insofar as it includes the conjugation path and carrier recovery path, receives as inputs both the equalized data block 123 (input to the carrier recovery path and the right-hand side of the tap update path) and the pre-equalized digital data signal block X(m) 110 (input to the conjugation path).

Thus, between each decision error tap update interval, the decision error tap update path updates the values of the MIMO equalizer taps in accordance with following equation:

$$W(m)=W(m-1)+2\mu G\{E(m-1)X(m-1)^*\} \tag{1}$$

or, if polarization-multiplexed, the equations:

$$W_{xx}(m)=W_{xx}(m-1)+2\mu G\{E_x(m-1)X(m-1)^*\} \tag{2}$$

$$W_{yx}(m)=W_{yx}(m-1)+2\mu G\{E_x(m-1)Y(m-1)^*\} \tag{3}$$

$$W_{xy}(m)=W_{xy}(m-1)+2\mu G\{E_y(m-1)X(m-1)^*\} \tag{4}$$

$$W_{yy}(M)=W_{yy}(M-1)+2\mu G\{E_y(M-1)Y(M-1)^*\} \tag{5}$$

In operation, prior to a first round of equalization (m=1), the gradient constraint unit 144 may set the initial tap values 160 for the MIMO equalization taps 162 as W=all one-value bits [1 1 1 . . . 1], or $W_{xx}=W_{yy}=$all one-value bits [1 1 1 . . . 1] and $W_{xy}=W_{yx}=$all zero-value bits [0 0 0 . . . 0] in a polarization-multiplexed configuration.

Example embodiments of the current disclosure will now be described with reference to FIGS. 3-10. Some embodiments may significantly reduce the delay introduced by the decision error tap update path and/or carrier recovery path of the conventional FDEQ 100, while presenting a pilot-assisted FDEQ with low complexity for impairment compensation such as tracking SOP.

Figure 3:
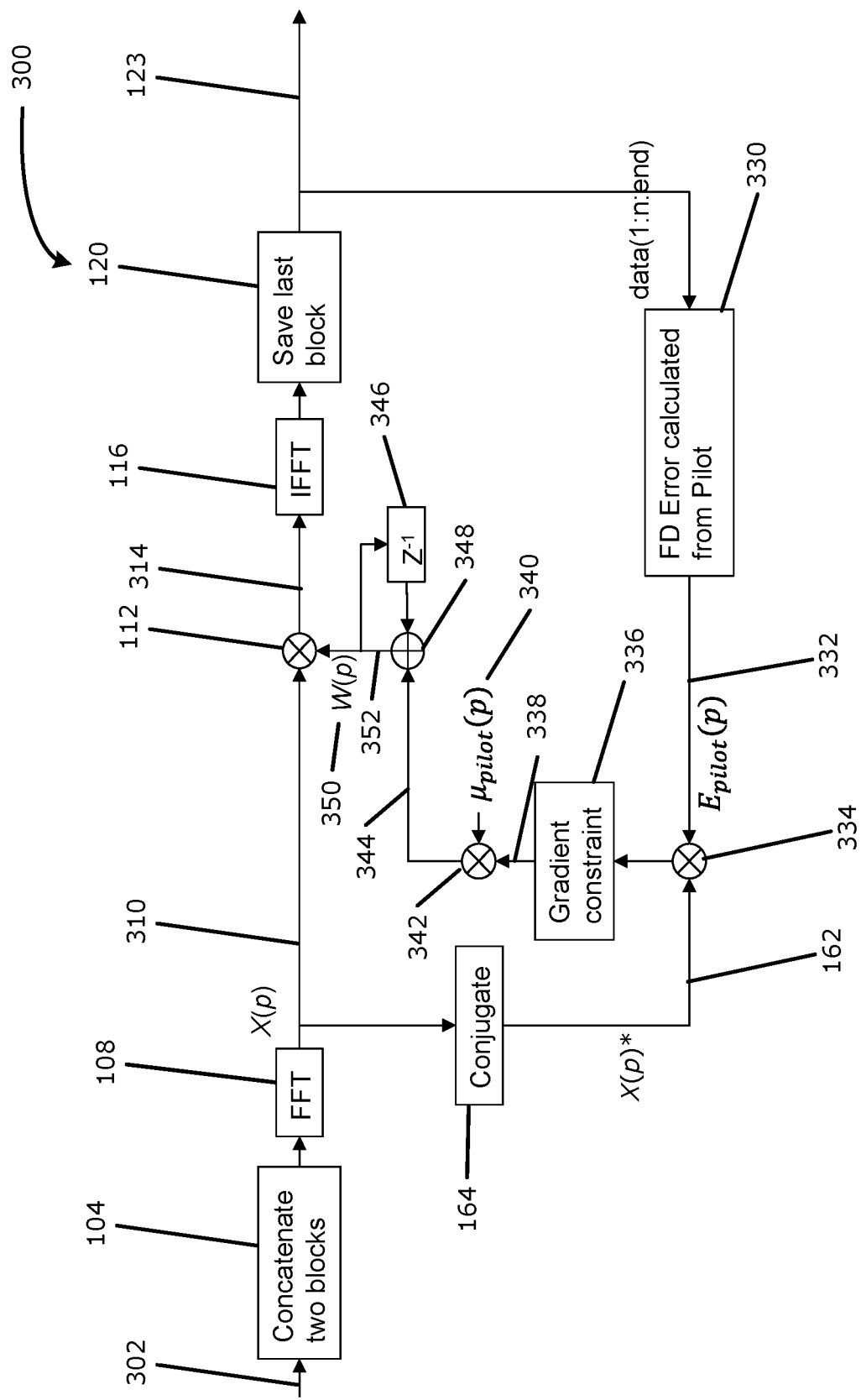
FIG. 3 is a block diagram of a pilot-assisted FDEQ, in accordance with examples described herein.

FIG. 3 is a block diagram of a pilot-assisted FDEQ 300 used as an adaptive equalizer by a receiver DSP such as DSP 26. The pilot-assisted FDEQ 300 performs equalization on a data signal containing pilot symbols inserted between every (n−1) data symbols by the transmitter, as described above. Thus, the pilot-assisted FDEQ 300 is used by a receiver 4 whose coherent receiver (e.g., ICR 20) receives an optical signal (e.g., over optical link 6) comprising a plurality of pilot symbols and a plurality of data symbols, and wherein the coherent receiver generates an electrical signal based on the optical signal. The ADC 24 generate the digital signal 302 based on the electrical signal such that the digital signal 302 also includes a plurality of pilot symbols and a plurality of data symbols.

The pilot-assisted FDEQ 300 includes an equalization path substantially similar to that of the conventional FDEQ 100. The digital signal 302 has two blocks concatenated and is transformed into the frequency domain to generate frequency domain data block 310 of size 2N. Equalizer taps 352 are used to multiply the tap values 350 by the frequency domain data block 310 using multiplier 112 to generate the (frequency-domain) equalized signal 314, which is transformed back to the time domain and has the previous block of N symbols removed to generate the equalizer output signal 123. As in the conventional FDEQ 100, for a polarization-multiplexed configuration these operations are performed on each of the X- and Y-polarized channels of the digital signal 302.

The tap update path of the pilot-assisted FDEQ 300 (called a pilot error tap update path because it updates the tap values 350 based on a pilot symbol-based error) also includes a conjugation path substantially similar to that of the conventional FDEQ 100, constituting a conjugation module 164.

The tap update path of the pilot-assisted FDEQ 300, however, diverges significantly from that of the conventional FDEQ 100 and may significantly reduce delay and/or complexity for impairment compensation such as SOP tracking. Rather than the decision-directed error calculation of the decision error tap update path of the conventional FDEQ 100, which calculates error based on N symbols of data, the pilot-assisted FDEQ 300 has a pilot error tap update path that calculates error based on only k pilot symbols. The calculation of error based on the pilot symbols also reduces the complexity of the components required by the tap update path. Thus, because of the reduced time required to perform pilot-based error instead of decision-directed error, the pilot error tap update latency (i.e. loop delay) may be significantly shorter than the decision error tap update latency in some embodiments. Furthermore, in some embodiments the pilot error tap update interval may be different (e.g. shorter) from the decision error tap update interval. The pilot error tap update interval may thus be represented as the time period between a $p^{th}$ data block and a $(p+1)^{th}$ data block, using index p for the pilot-assisted FDEQ 300 instead of index m used by conventional FDEQ 100 to represent the different tap update intervals.

The pilot error tap update path of the pilot-assisted FDEQ 300 includes a frequency domain error calculation module 330 to calculate error based on an N-symbol block of the equalizer output signal 123. The operation of the frequency domain error calculation module 330 is described in detail below with reference to method 500 shown in FIG. 5. The frequency domain error calculation module 330 generates pilot error signal $E_{pilot}$ 332, which constitutes a block of 2N symbols. Pilot error signal $E_{pilot}$ 332 is multiplied by the conjugate signal X* 162 using a second pilot multiplier 334, the result being propagated to a gradient descent unit 336 as in the conventional FDEQ 100. The constrained pilot error gradient signal 338 generated by the gradient constraint unit 336 is multiplied by two times a pilot step size $\mu_{pilot}$ 154 by a third pilot multiplier 342 to generate a pilot step-scaled signal 344. A second pilot adder 348 adds the pilot step-scaled signal 344 to the previous value of the equalizer taps from the previous pilot error update interval, W(p−1), held by the delay units 346 of the equalizer taps 352, to generate the updated equalizer tap values W(p) 350.

Thus, the pilot error tap update path updates the values of the MIMO equalizer taps in accordance with following equation:

$$W(p)=W(p-1)+2\mu_{pilot}G\{E_{pilot}(p-1)X(p-1)^*\} \quad (6)$$

or, if polarization-multiplexed, the equations:

$$W_{xx}(p)=W_{xx}(p-1)+2\mu_{pilot}G\{E_{pilot}(p-1)X(p-1)^*\} \quad (7)$$

$$W_{yx}(p)=W_{yx}(p-1)+2\mu_{pilot}\{E_{pilot}(p-1)Y(p-1)^*\} \quad (8)$$

$$W_{xy}(p)=W_{xy}(p-1)+2\mu_{pilot}\{E_{pilot}(p-1)X(p-1)^*\} \quad (9)$$

$$W_{yy}(p)=W_{yy}(p-1)+2\mu_{pilot}\{E_{pilot}(p-1)Y(p-1)^*\} \quad (10)$$

Thus, it will be appreciated that, in some embodiments, the pilot-assisted FDEQ 300 may differ from the conventional FDEQ 100 primarily in four respects: first, the pilot-assisted FDEQ 300 does not rely on a carrier recovery path as part of its tap update path and so does not need to delay its error calculation to await the carrier recovery path output; second, because of the omission of the carrier recovery path, the pilot error tap update path of the pilot-assisted FDEQ 300 calculates error based on k symbols of the equalized digital signal 123 instead of N symbols of the phase-compensated decision signal 136; third, the pilot-assisted FDEQ 300 calculates its pilot error signal $E_{pilot}$ 332 differently from how the conventional FDEQ 100 calculates the decision error signal E 144; and fourth, as a result of the foregoing, the equalization loop delay of the pilot-assisted FDEQ 300 is lower.

Figure 4:
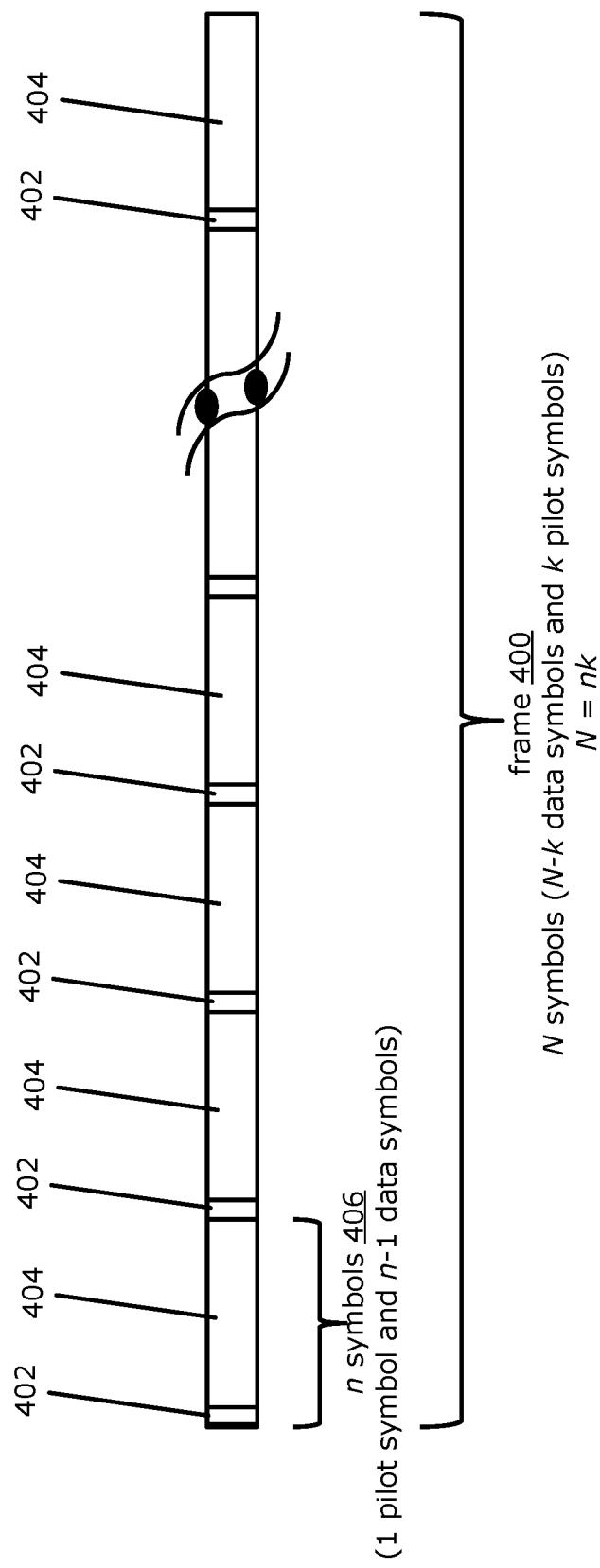
FIG. 4 is a schematic of a frame of a digital signal including pilot symbols, in accordance with examples described herein.

FIG. 4 is a schematic of a frame 400 of a digital signal including pilot symbols, such as digital signal 302 received and equalized by pilot-assisted FDEQ 300. The frame 400 is generated and transmitted by a transmitter (such as transmitter 2 of FIG. 1) using a pilot-assistance scheme as described herein. It will be appreciated that a conventional transmitter 2 could be modified to generate and insert pilot symbols into a data stream using a modified version of conventional transmitter DSP 18. After generating the frame 400, the transmitter transmits the frame 400 in the form of an optical signal over the optical link 6.

The frame 400 constitutes N symbols, wherein N=kn. Every n symbols 406 of the frame 400 includes 1 pilot symbol 402 and (n−1) data symbols 404, such that the frame 400 includes k pilot symbols 402 and (N−k) data symbols.

In some embodiments, the pilot symbols are distributed at regular intervals between every (n−1) data symbols 404. In some embodiments, the frame 400 begins with a pilot symbol 402; in other embodiments, the frame may start with (n−1) data symbols 404.

Whereas the example embodiments will be described with reference to the pilot symbol insertion scheme of frame 400 of FIG. 4, it will be appreciated that some embodiments may use alternative pilot symbol distributions throughout a frame of the data signal.

A single frame 400 of the digital signal 302 received by the pilot-assisted FDEQ 300 corresponds to a single block of N symbols, such as the $p^{th}$ block of digital signal 302.

Figure 5:
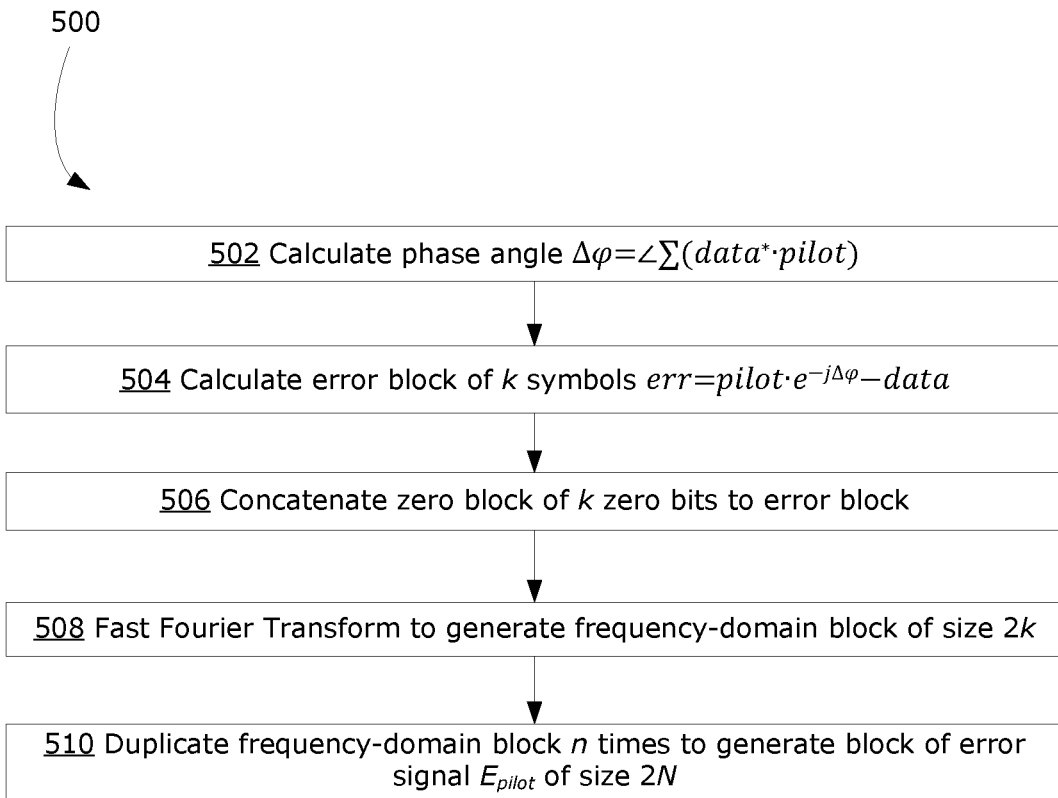
FIG. 5 is a flowchart showing an example method for calculating the pilot error signal $E_{pilot}$ of the pilot-assisted FDEQ of FIG. 3.

FIG. 5 is a flowchart showing an example method 500 for calculating the pilot error signal $E_{pilot}$ 332 of the pilot-assisted FDEQ 300 of FIG. 3 using the frequency domain error calculation module 330.

At 502, the frequency domain error calculation module 330 receives a block of N symbols of the equalized data signal 314 in the time domain and calculates a phase angle $\Delta\varphi$ as the as the sum of, for each of the k pilot symbols of the data block, the angle between the predetermined pilot symbol characteristics (referred to as pilot and represented as (1+1j)) and the characteristics of a corresponding received actual pilot symbol (referred to as data and represented as (a+bj)). In some embodiments, this phase angle may be calculated as $\Delta\varphi=\angle\Sigma(data^*\cdot pilot)$, or the angle of summation of the multiplication of each conjugate of the actual received pilot symbol and each corresponding predetermined pilot symbol. In embodiments using quadrature phase shift keying (QPSK) symbols or binary phase shift keying (BPSK) symbols for the pilot symbols, this calculation can be simplified from the multiplication operation data*·pilot to the addition operation $(a+bj)^*\cdot(1+1j)=(a-bj)\cdot(1+1j)=a-b+(a+b)j$.

At 504, the frequency domain error calculation module 330 generates an error block of k symbols, wherein each symbol is the difference between: (1) one of the k predetermined pilot symbols adjusted by the phase angle $\Delta\varphi$ and (2) the one of corresponding k received pilot symbols, i.e. $err=pilot\cdot e^{-j\Delta\varphi}-data$.

At 506, the frequency domain error calculation module 330 concatenates a zero block of k zero bits to the error block to generate a block of 2k symbols, e.g., k zero bits followed by k error bits.

508, the frequency domain error calculation module 330 applies a discrete 2k fast Fourier transform to transform the concatenated error block and zero block to the frequency domain to generate a frequency-domain block of 2k symbols.

At 510, the frequency domain error calculation module 330 duplicates the frequency-domain block n times to generate a block of the error signal $E_{pilot}$ of 2N symbols.

In some embodiments, the pilot symbols of the optical signal (and therefore of digital signal 302) are either quadrature phase shift keying (QPSK) symbols or binary phase shift keying (BPSK) symbols. This enables the calculation of the phase angle $\Delta\varphi$ using an addition operation instead of the multiplication required for error calculation in the conventional FDEQ 100.

In some embodiments, the receiver 4 may use a hybrid FDEQ having both a pilot error tap update path, as in the pilot-assisted FDEQ 300, and a decision error tap update path, as in the conventional FDEQ 100. A hybrid FDEQ with both such paths may in some embodiments be configured to selectively activate and deactivate one or both of the tap update paths, such that the hybrid FDEQ may operate in a pilot-assisted mode using only the pilot error tap update path, a decision-directed mode using only the decision error tap update path, or a hybrid mode using both tap update paths. In some embodiments, the hybrid FDEQ may initially operate in decision-directed mode or hybrid mode until the equalizer signal is locked (i.e., the values of the equalizer taps achieve equilibrium for impairment compensation such as SOP tracking). This state may be referred to herein as the equalizer taps being locked, the tap values being locked, or the equalizer being locked. In some embodiments, determining that the MIMO tap values have locked comprises calculating a root-means-squared (RMS) value of time-domain errors and determining that the RMS error value is smaller than a threshold. It will be appreciated that references to a value or component "locking" or being "locked" refers to a state of equilibrium or a steady state, as in the context of a phase locked loop, and does not refer to a state in which the value or component can no longer be changed.

After the tap values are locked, the hybrid FDEQ may continue to operate in pilot-assisted mode, deactivating the decision error tap update path and using only the pilot error tap update path, with its lower latency and lower complexity, to equalize the digital signal. In some embodiments, activation and deactivation of the tap update paths, and detection of equalizer signal locking, may be performed by a controller included in the receiver 4. An example hybrid FDEQ is described below with reference to FIG. 6. Operation of a hybrid FDEQ is described with reference to FIG. 7, and tap update methods using a hybrid FDEQ are described with reference to FIG. 8 (decision-directed mode), FIG. 9 (pilot-assisted mode), and FIG. 10 (hybrid mode).

Figure 6:
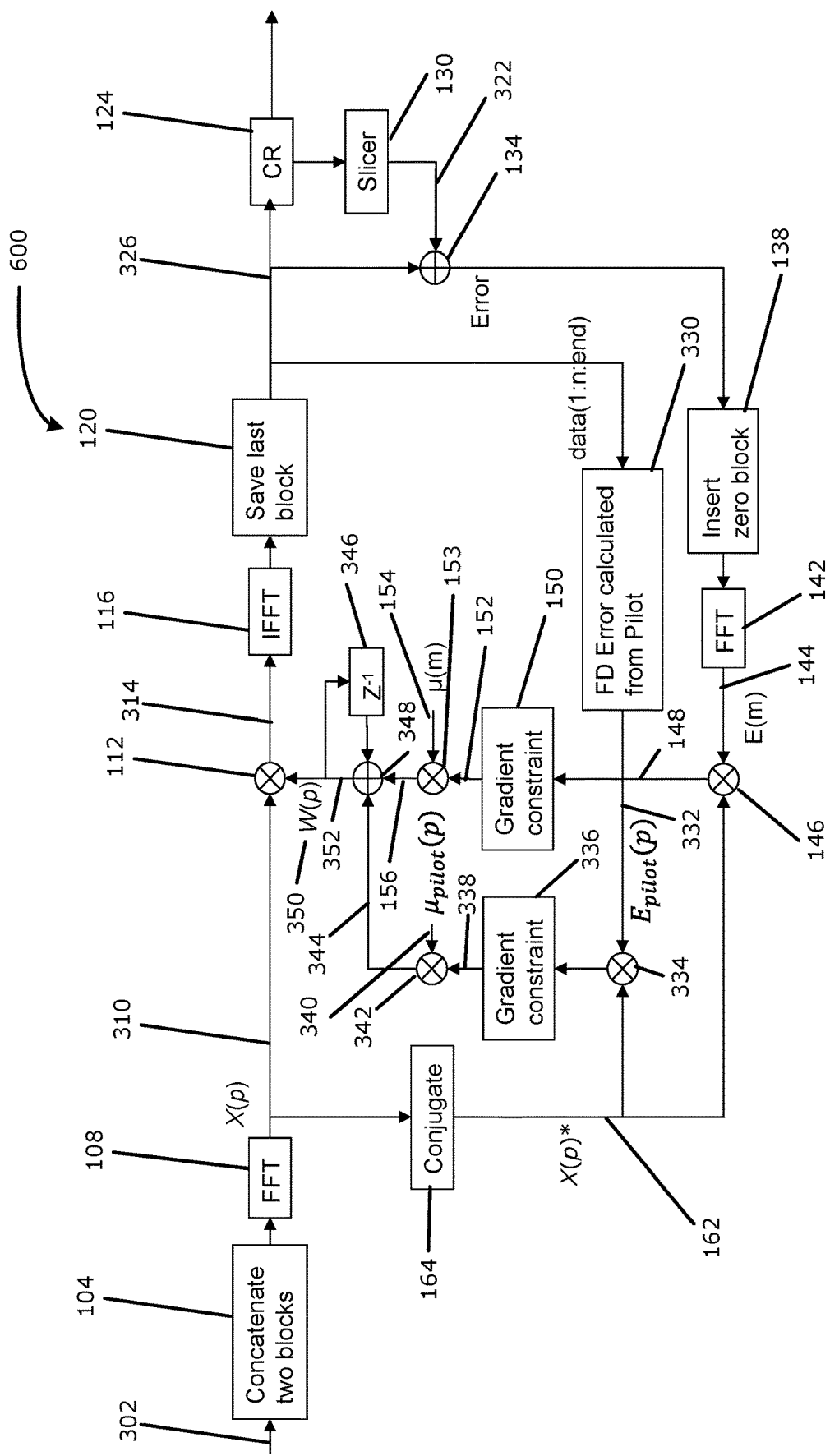
FIG. 6 is a block diagram of a hybrid FDEQ with a pilot error tap update path and a decision error update path, in accordance with examples described herein.

FIG. 6 is a block diagram of a hybrid FDEQ 600 with a pilot error tap update path and a decision error update path. It will be appreciated that each component of the hybrid FDEQ 600 corresponds to a component of the conventional FDEQ 100 or pilot-assisted FDEQ 300 and operates in a substantially similar manner, unless otherwise indicated. In decision-directed mode, the pilot error tap update path is deactivated, and the hybrid FDEQ 600 operates as the conventional FDEQ 100. In pilot-assisted mode, the decision error tap update path is deactivated, and the hybrid FDEQ 600 operates as the pilot-assisted FDEQ 300. In hybrid mode, both update paths may operate concurrently to update the equalizer taps in accordance with the methods described below with reference to FIG. 10.

In some embodiments, phase-compensated decision signal 322 may include pilot symbols, making it distinct from the phase-compensated decision signal 132 of the conventional FDEQ 100.

In hybrid FDEQ 600, the conjugation path including the conjugation module 164 may be considered part of both the pilot error tap update path and the decision error tap update path. It may be referred to simply as part of the equalizer 600.

The hybrid FDEQ 600 may include additional logic not shown in FIG. 6 for synchronizing the decision error tap update path with the pilot error update path. For example, in embodiments wherein the decision error update interval is different (e.g., longer) than the pilot error update interval, the tap values W 350 may be updated by the pilot error tap update path at every pilot error update interval, but the tap values W 350 are only updated by the decision error tap update path once every several pilot error update intervals. Thus, in an example embodiment, the decision error update interval may be set to five times the duration of the pilot error update interval. In such an embodiment, a controller switch of the decision error tap update block may be enabled once for every 5 blocks, and a sequence of tap value updates may be defined as follows:

$$W(10)=W(9)+2\mu_{Pilot}G\{E_{pilot}(9)X^*(9)\}+2\mu G\{E(9)X^*(9)\}$$

$$W(11)=W(10)+2\mu_{Pilot}G\{E_{pilot}(10)X^*(10)\}$$

$$W(12)=W(11)+2\mu_{Pilot}G\{E_{pilot}(11)X^*(11)\}$$

$$W(13)=W(12)+2\mu_{Pilot}G\{E_{pilot}(12)X^*(12)\}$$

$$W(14)=W(13)+2\mu_{Pilot}G\{E_{pilot}(13)X^*(13)\}$$

$$W(15)=W(14)+2\mu_{Pilot}G\{E_{pilot}(14)X^*(14)\}\pm 2\mu G\{E(14)X^*(14)\}$$

$$W(16)=W(15)+2\mu_{Pilot}G\{E_{pilot}(15)X^*(15)\}$$

$$W(17)=W(16)+2\mu_{Pilot}G\{E_{pilot}(16)X^*(16)\}$$

$$W(18)=W(17)+2\mu_{Pilot}G\{E_{pilot}(17)X^*(17)\}$$

$$W(19)=W(18)+2\mu_{Pilot}G\{E_{pilot}(18)X^*(18)\}$$

The indices m and p are both used in the various equations described herein to differentiate the different tap update intervals and different tap update latencies of the two tap update paths, and the relationship between m and p will be defined by the design of the particular hybrid FDEQ 600.

Figure 7:
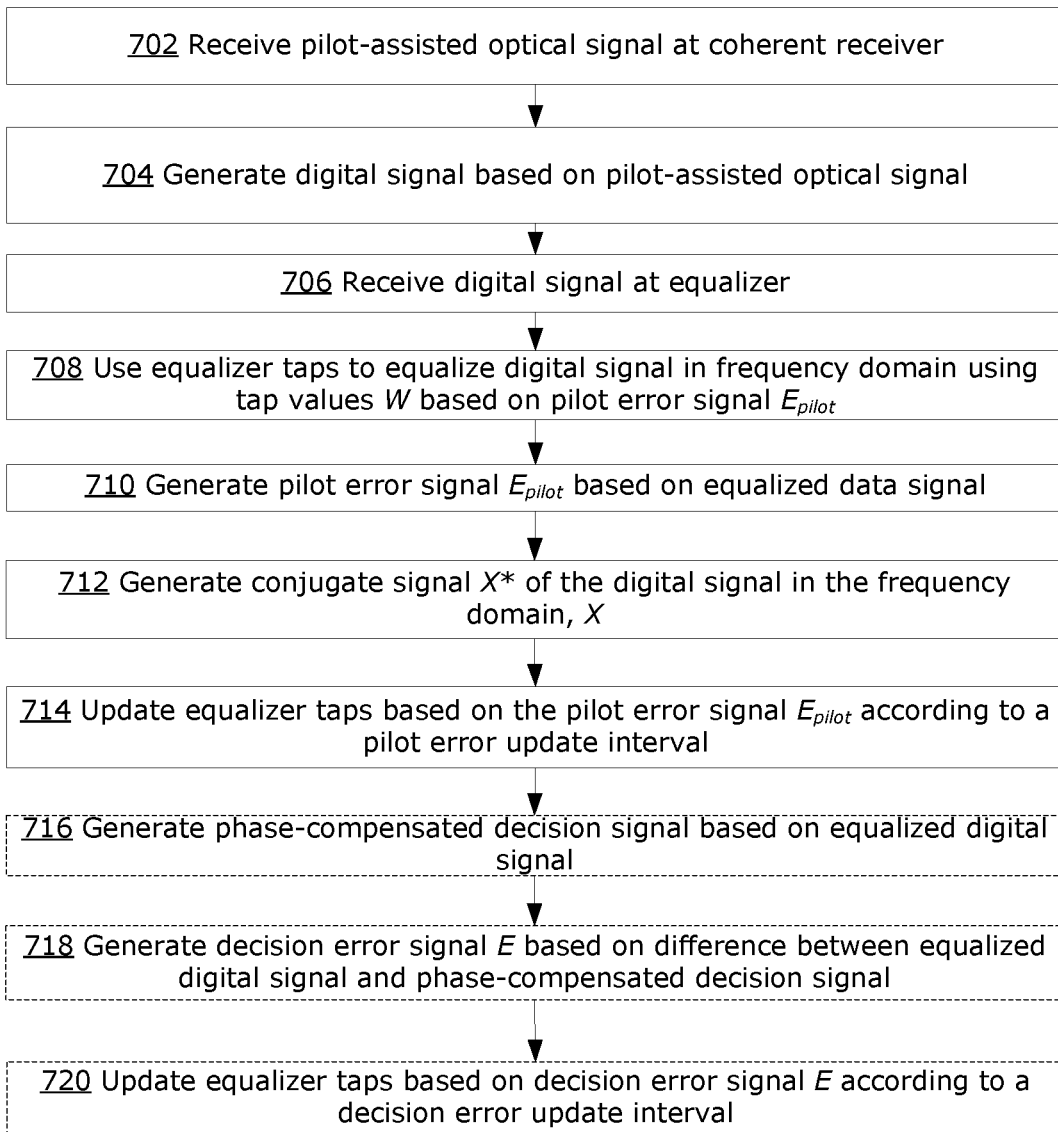
FIG. 7 is a flowchart showing an example method for providing frequency-domain equalization to a digital signal, in accordance with examples described herein.

FIG. 7 is a flowchart showing an example method 700 for providing frequency-domain equalization to a digital signal, using a pilot-assisted FDEQ or a hybrid FDEQ such as pilot-assisted FDEQ 300 or hybrid FDEQ 600. Optional steps of method 700, shown in dashed lines, correspond to decision-directed tap updating performed by the decision error tap update path of a hybrid FDEQ in hybrid mode. If these steps are omitted, the method 700 corresponds to operation of a pilot-assisted FDEQ, or operation of a hybrid FDEQ in pilot-assisted mode.

Method 500 of FIG. 5, as well as methods 700, 800, 900, and 1000 of FIGS. 7-10 respectively, are described with reference to example FDEQs described above. However, it will be appreciated that these methods may be performed by different embodiments of a pilot-assisted FDEQ or hybrid FDEQ.

At 702, the coherent receiver (e.g. ICR 20) receives a pilot-assisted optical signal, the pilot-assisted optical signal comprising a plurality of pilot symbols and a plurality of data symbols. In some embodiments, the pilot symbol insertion scheme of frame 400 may be used.

At 704, the coherent receiver (such as ICR 20) generates an electrical signal based on the pilot-assisted optical signal.

At 706, an equalizer (such as pilot-assisted FDEQ 300 or hybrid FDEQ 600) receives a digital signal (such as digital signal 302), the digital signal comprising a plurality of pilot symbols and a plurality of data symbols. The digital signal is based on the electrical signal. In some embodiments, the digital signal is generated by an ADC 24 based on the electrical signal generated by the coherent receiver.

At 708, the equalizer taps 352 are used to equalize the digital signal in the frequency domain using tap values W 350 based on the pilot error signal $E_{pilot}$ 332, thereby generating an equalized digital signal 314.

At 710, the pilot error signal $E_{pilot}$ is generated by the frequency domain error calculation module 330 based on calculating a phase angle $\Delta\varphi$ based on the angle between one or more predetermined pilot symbols and one or more received pilot symbols of the equalized digital signal 314. This calculation, including additional steps after calculating the phase angle, is described in greater detail above with reference to method 500 of FIG. 5.

At 712 the conjugate signal X* of the digital signal is generated in the frequency domain X by conjugation module 164.

At 714, the equalizer tap values 350 are updated based on the pilot error signal $E_{pilot}$ according to the pilot error update interval, i.e., after pilot error update interval p has elapsed, the taps 352 are updated with the updated tap values W(p+1) 350. Step 714 is described below in greater detail with reference to method 900 of FIG. 9.

Optionally, steps 716 through 720 are performed, corresponding to the operation of the decision error tap update path of a hybrid FDEQ.

At 716, a phase-compensated decision signal 322 is generated by the carrier recovery path (e.g. carrier recovery module 124 and slicer 130) and time-domain errors are generated by adder 134 based on the equalized digital signal 314 (more specifically, based on the equalizer output signal 123 in the time domain) and phase-compensated decision signal 322.

At 718, the insert zero block 138 and FFT module 142 generates the frequency-domain error signal E 144 based on the difference between the equalized digital signal 314 (more particularly, equalizer output signal 123) and the phase-compensated decision signal 322. The details of this calculation are described above with reference to the insert zero block 138 of FIG. 2.

At 720, the equalizer taps 352 are updated based on decision error signal E 144 according to a decision error update interval. The pilot error update interval is shorter than the decision error update interval in some embodiments, as noted above. Step 720 is described below in greater detail with reference to method 1000 of FIG. 10.

Figure 8:
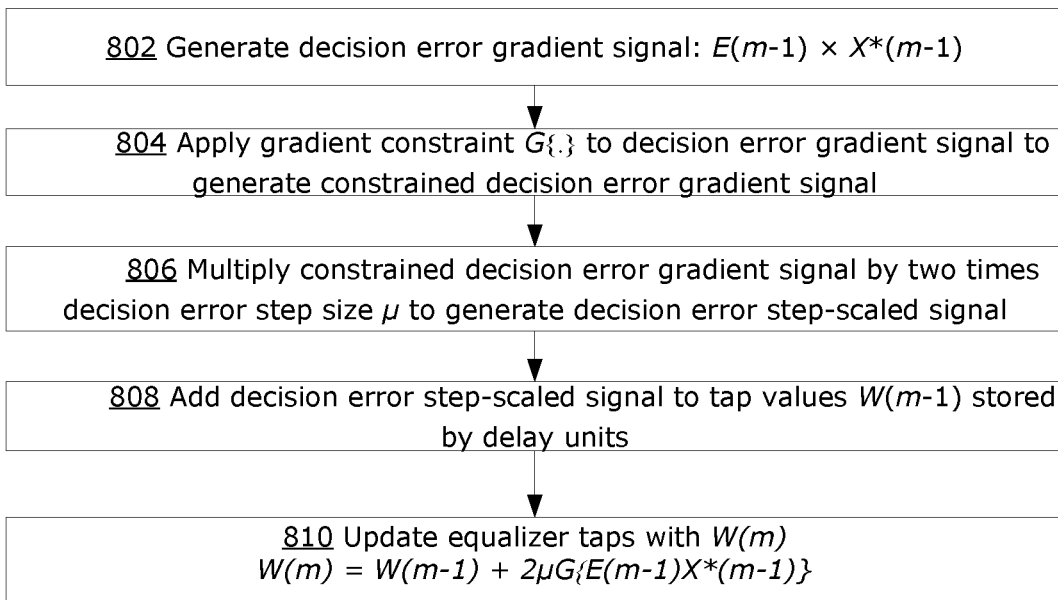
FIG. 8 is a flowchart showing an example method for updating the equalizer taps in a decision-directed mode based on decision error signal E, in accordance with the FDEQ of FIG. 6.

FIG. 8 is a flowchart showing an example method 800 for updating the equalizer taps based on decision error signal E. This method 800 corresponds to operation of a hybrid FDEQ such as hybrid FDEQ 600 in decision-directed mode. As such, it generally corresponds to the steps of operation of the tap update path of the conventional FDEQ 100.

At 802, the decision error gradient signal 148 is generated by multiplying the decision error signal E 144 at previous decision time interval (m−1) by the conjugate signal X* at previous decision time interval (m−1), such that decision error gradient signal 148=E(m−1)×X*(m−1).

At 804, gradient constraint G{.} is applied by the gradient constraint unit 150 to decision error gradient signal 148 to generate the constrained decision error gradient signal 152.

At 806, the constrained decision error gradient signal 152 is multiplied by two times the decision error step size μ 154 to generate the decision error step-scaled signal 156 using multiplier 153.

At 808, adder 348 adds the decision error step-scaled signal 156 to the previous tap values W(m−1) stored by the delay units 346 to generate the updated tap values W(m) 350.

At 810, the equalizer taps 352 are updated using the updated tap values W(m) 350, wherein W(m)=W(m−1)+2 μG{E(m−1)X*(m−1)} (per equation 1, or equations 2-5 above for a polarization-multiplexed configuration).

Figure 9:
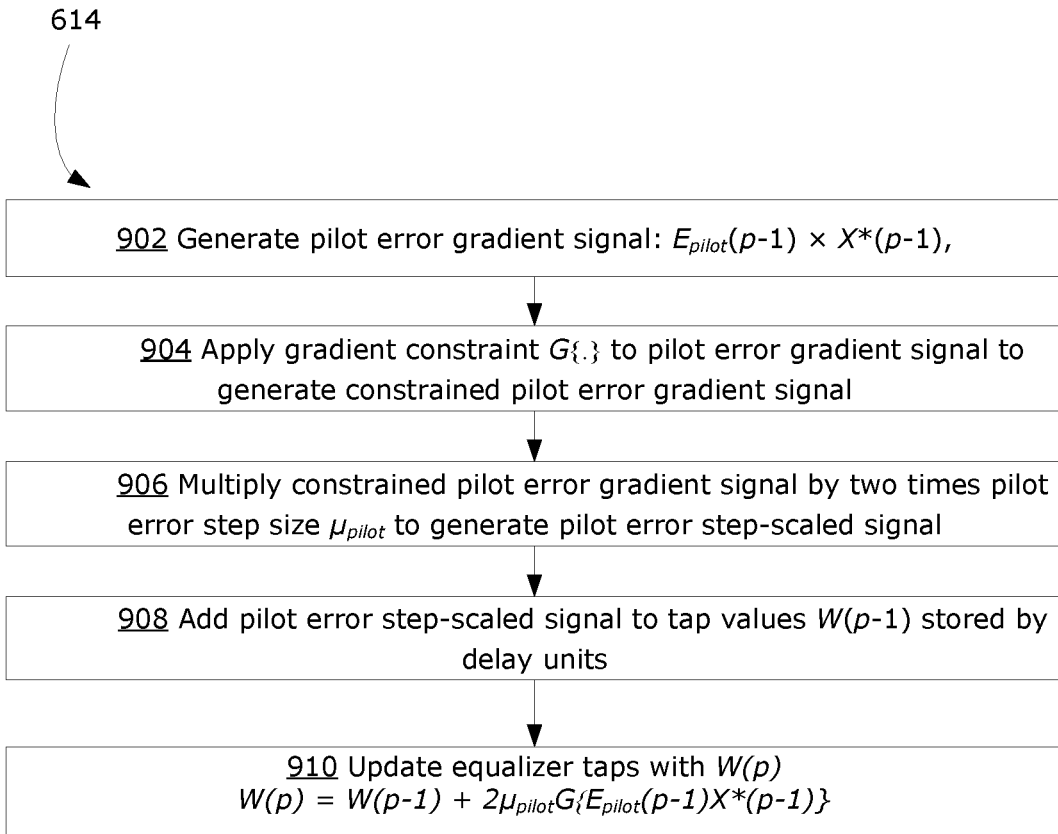
FIG. 9 is a flowchart showing an example method for updating the equalizer taps in a pilot-assisted mode based on pilot error signal $E_{pilot}$, in accordance with the FDEQ of FIG. 3 or FIG. 6.

FIG. 9 is a flowchart showing an example method for updating the equalizer taps based on pilot error signal $E_{pilot}$ 332. This method 900 corresponds to operation of a hybrid FDEQ such as hybrid FDEQ 600 in pilot-assisted mode, or operation of a pilot-assisted FDEQ such as pilot-assisted FDEQ 300.

At 902, the pilot error gradient signal is generated by multiplying the decision error signal $E_{pilot}$ 332 at previous pilot time interval (p−1) by the conjugate signal X* at previous pilot time interval (m−1): pilot error gradient signal 148=E(m−1)×X*(m−1).

At 904, gradient constraint G{.} is applied by the gradient constraint unit 336 to pilot error gradient signal to generate the constrained pilot error gradient signal 338.

At 906, the constrained pilot error gradient signal 338 is multiplied by two times the pilot error step size $\mu_{pilot}$ 340 to generate the pilot error step-scaled signal 344 using multiplier 342.

At 908, adder 348 adds the pilot error step-scaled signal 344 to the previous tap values W(p−1) stored by the delay units 346 to generate the updated tap values W(p) 350.

At 910, the equalizer taps 352 are updated using the updated tap values W(p) 350, wherein W(p)=W(p−1)+ $2\mu_{pilot}G\{E_{pilot}(p-1)X^*(p-1)\}$ (per equation 6, or equations 7-10 above for a polarization-multiplexed configuration).

Figure 10:
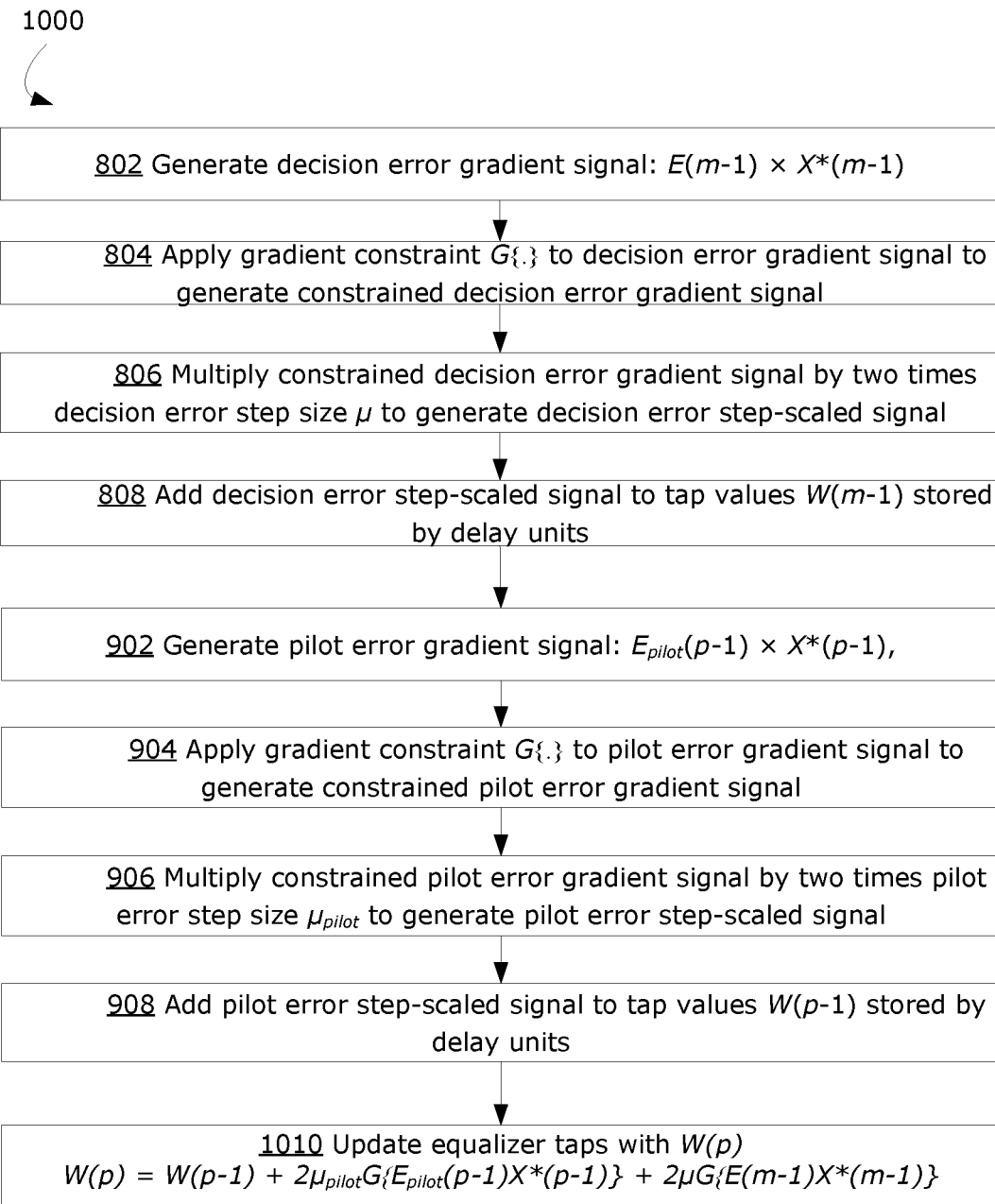
FIG. 10 is a flowchart showing an example method for updating the equalizer taps in a hybrid mode based on decision error signal E and pilot error signal $E_{pilot}$, in accordance with the FDEQ of FIG. 6.

FIG. 10 is a flowchart showing an example method for updating the equalizer taps based on decision error signal E 144 and pilot error signal $E_{pilot}$ 332. This method 1000 corresponds to operation of a hybrid FDEQ such as hybrid FDEQ 600 in hybrid mode.

Method 1000 performs steps 802 to 808 of method 800 to generate a decision error based tap updating value, and concurrently performs steps 902 to 908 of method 900 to generate a pilot error based tap updating value. Method 800 is performed in time with the decision error update interval, whereas method 900 is performed in time with the pilot error update interval.

At 1010, the equalizer taps 352 are updated using the updated tap values W(p) 350, in accordance with equation 1, or equations 12-15 for a polarization-multiplexed configuration. Some embodiments may update the equalizer taps by taking into account both the current value of pilot step-scaled signal 344 and the current value of step-scaled signal 156, with the pilot error tap update path updating the taps at every pilot error update interval and the decision error tap update path updating the taps at every decision error update interval.

Thus, the tap update paths jointly update the values of the MIMO equalizer taps in accordance with following equation:

$$W(p)=W(p-1)+2\mu_{pilot}G\{E_{pilot}(p-1)X(p-1)^*\}+ 2\mu G\{E(m-1)X(m-1)^*\} \quad (11)$$

or, if polarization-multiplexed, the equations:

$$W_{xx}(p)=W_{xx}(p-1)+2\mu_{pilot}G\{E_{pilot}(p-1)X(p-1)^*\}+ 2\mu G\{E_x(m-1)X(m-1)^*\} \quad (12)$$

$$W_{yx}(p)=W_{yx}(p-1)+2\mu_{pilot}G\{E_{pilot}(p-1)Y(p-1)^*\}+ 2\mu G\{E_x(m-1)Y(m-1)^*\} \quad (13)$$

$$W_{xy}(p)=W_{xy}(p-1)+2\mu_{pilot}G\{E_{pilot}(p-1)X(p-1)^*\}+ 2\mu G\{E_y(m-1)X(m-1)^*\} \quad (14)$$

$$W_{yy}(p)=W_{yy}(p-1)+2\mu_{pilot}G\{E_{pilot}(p-1)Y(p-1)^*\}+ 2\mu G\{E_y(m-1)Y(m-1)^*\} \quad (15)$$

Simulation results have demonstrated that a pilot-assisted FDEQ as described herein may improve bit error rate (BER) dramatically at a large SOP rate. In particular, for an SOP rate lower than 50 kHz, a pilot-assisted FDEQ or hybrid FDEQ in pilot-assisted mode has a very good performance. For SOP rates above 50 kHz, the pilot-assisted mode may not correct BER as effectively as the hybrid mode.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processor device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A device comprising:
   a coherent receiver for receiving an optical signal and generating an electrical signal based on the optical signal, the optical signal comprising a plurality of pilot symbols and a plurality of data symbols; and
   a frequency-domain adaptive equalizer (FDEQ) configured to receive a digital signal based on the electrical signal, comprising:
      an equalization path comprising one or more equalizer taps for equalizing the digital signal in the frequency domain using one or more tape values based on a pilot error signal, thereby generating an equalized digital signal; and
      a pilot error tap update path for:
         generating the pilot error signal by calculating a phase angle based on the angle between one or more predetermined pilot symbols and one or more received pilot symbols of the equalized digital signal; and
         updating the equalizer taps based on the pilot error signal according to a pilot error update interval.

2. The device of claim 1, further comprising:
   a decision error tap update path comprising a carrier recovery path for generating a phase-compensated decision signal based on the equalized digital signal, the decision error tap path being configured to:

generate a decision error signal based on the difference between the equalized digital signal and the phase-compensated decision signal; and update the equalizer taps based on the decision error signal according to a decision error update interval, the pilot error update interval being shorter than the decision error update interval, wherein the tap values are also based on the decision error signal.

3. The device of claim 2, wherein the device is configured to selectively activate and deactivate the decision error tap update path.

4. The device of claim 3, wherein the device is configured to selectively activate and deactivate the pilot error tap update path.

5. The device of claim 4, wherein the device is configured to deactivate the decision error tap update path after the equalizer is locked.

6. The device of claim 5, wherein the device is further configured to:

update the equalizer taps using the decision error tap update path, with the pilot error tap update path deactivated, until the equalizer is locked; and activate the pilot error tap update path after the equalizer is locked.

7. The device of claim 2, wherein:

the equalizer further comprises a conjugation path for generating a conjugate signal of the digital signal in the frequency domain;

the decision error tap update path is configured to update the equalizer taps at a decision error time interval by:
generating a decision error gradient signal by multiplying:
the decision error signal at a previous decision time interval by
the conjugate signal at the previous decision time interval,
applying a gradient constraint to the decision error gradient signal to generate a constrained decision error gradient signal; and
multiplying the constrained decision error gradient signal by two times a decision error step size to generate a decision error step-scaled signal; and the pilot error tap update path is configured to update the equalizer taps at a pilot error time interval by:
generating a pilot error gradient signal by multiplying:
the pilot error signal at a previous pilot time interval by
the conjugate signal X* at the previous pilot time interval,
applying the gradient constraint to the pilot error gradient signal to generate a constrained pilot error gradient signal;
multiplying the constrained pilot error gradient signal by two times a pilot error step size to generate a pilot error step-scaled signal;
adding the pilot error step-scaled signal and the decision error step-scaled signal to the tap values from a previous pilot time interval stored by one or more delay units to generate one or more updated tap values; and
updating the equalizer taps with the updated tap values at the pilot error time interval.

8. The device of claim 1, wherein:

the equalizer further comprises a conjugation path for generating a conjugate signal of the digital signal in the frequency domain; and the pilot error tap update path is configured to update the equalizer taps at a pilot error time interval by:
generating a gradient signal by multiplying:
the pilot error signal at a previous pilot time interval by
the conjugate signal at the previous pilot time interval,
applying a gradient constraint to the gradient signal to generate a constrained gradient signal;
multiplying the constrained gradient signal by two times a pilot error step size to generate a step-scaled signal;
adding the step-scaled signal to the taps values from the previous pilot time interval stored by one or more delay units to generate one or more updated tap values; and
updating the equalizer taps with the updated tap values at the pilot error time interval.

9. The device of claim 1, wherein:

the pilot symbols of the optical signal are either quadrature phase shift keying (QPSK) symbols or binary phase shift keying (BPSK) symbols; and calculating the phase angle comprises an addition operation.

10. The device of claim 9, wherein the pilot error tap update path generates the pilot error signal by:

receiving a data block of N symbols of the equalized digital signal, the N symbols comprising k received pilot symbols distributed at regular intervals between every (n−1) data symbols, wherein kn=N and n, k, and N are positive integers;

calculating the phase angle as the sum of, for each of the k pilot symbols, the angle between a predetermined pilot symbol and the corresponding received pilot symbol of the data block, wherein N=kn;

generating an error block of k symbols, wherein each symbol is the difference between:
one of the k predetermined pilot symbols adjusted by the phase angle; and
one of the corresponding k received pilot symbols;

concatenating the error block with a zero block of k zero-value symbols;

applying a Fourier transform to the concatenated error block and zero block to the frequency domain to generate a frequency-domain block of 2k symbols; and duplicating the frequency-domain block n times to generate a block of the error signal 2N symbols.

11. A method comprising:

receiving a digital signal comprising a plurality of pilot symbols and a plurality of data symbols;

using one or more equalizer taps to equalize the digital signal in the frequency domain using one or more tap values based on a pilot error signal, thereby generating an equalized digital signal;

generating the pilot error signal by calculating a phase angle based on the angle between one or more predetermined pilot symbols and one or more received pilot symbols of the equalized digital signal; and updating the equalizer taps based on the pilot error signal according to a pilot error update interval.

12. The method of claim 11, further comprising:

generating a phase-compensated decision signal based on the equalized digital signal;

generating a decision error signal based on the difference between the equalized digital signal and the phase-compensated decision signal; and updating the equalizer taps based on the decision error signal according to a decision error update interval, the pilot error update interval being shorter than the decision error update interval,
wherein the tap values W are also based on the decision error signal.

13. The method of claim 12, further comprising:
updating the equalizer taps based on the decision error signal until the equalizer is locked; and
updating the equalizer taps based on the pilot error signal after the equalizer is locked.

14. The method of claim 12, further comprising:
updating the equalizer taps based on the decision error signal and the pilot error signal until the equalizer is locked; and
updating the equalizer taps based on the pilot error signal after the equalizer is locked.

15. The method of claim 12, further comprising:
generating a conjugate signal of the digital signal in the frequency domain;
updating the equalizer taps at a decision error time interval by:
    generating a decision error gradient signal by multiplying:
        the decision error signal E at a previous decision time interval by
        the conjugate signal at the previous decision time interval,
    applying a gradient constraint to the decision error gradient signal to generate a constrained decision error gradient signal; and
    multiplying the constrained decision error gradient signal by two times a decision error step size to generate a decision error step-scaled signal; and
updating the equalizer taps at a pilot error time interval by:
    generating a pilot error gradient signal by multiplying:
        the pilot error signal at a previous pilot time interval by
        the conjugate signal at the previous pilot time interval,
    applying a gradient constraint to the pilot error gradient signal to generate a constrained pilot error gradient signal;
    multiplying the constrained pilot error gradient signal by two times a pilot error step size to generate a pilot error step-scaled signal;
    adding the pilot error step-scaled signal and the decision error step-scaled signal to the tap values from the previous pilot time interval stored by the equalizer taps to generate one or more updated tap values; and
    updating the equalizer taps with the updated tap values at the pilot error time interval.

16. The method of claim 11, further comprising:
generating a conjugate signal of the digital signal in the frequency domain; and
updating the equalizer taps at a pilot error time interval by:
    generating a gradient signal by multiplying:
        the pilot error signal at a previous pilot time interval by
        the conjugate signal at the previous pilot time interval,
    applying a gradient constraint to the gradient signal to generate a constrained gradient signal;
    multiplying the constrained gradient signal by two times a pilot error step size to generate a step-scaled signal;
    adding the step-scaled signal to the tap values from a previous pilot time interval stored by the equalizer taps to generate one or more updated tap values; and
    updating the equalizer taps with the updated tap values W(p) at the pilot error time interval.

17. The method of claim 11, further comprising:
receiving an optical signal at a coherent receiver, the optical signal comprising a plurality of pilot symbols and a plurality of data symbols; and
generating a digital signal based on the optical signal.

18. The method of claim 17, wherein:
the pilot symbols of the optical signal are either quadrature phase shift keying (QPSK) symbols or binary phase shift keying (BPSK) symbols; and
calculating the phase angle comprises an addition operation.

19. The method of claim 18, wherein:
the pilot error tap update path generates the pilot error signal by:
    receiving a data block of N symbols of the equalized digital signal, the N symbols comprising k received pilot symbols distributed at regular intervals between every (n−1) data symbols, wherein kn=N and n, k, and N are positive integers;
    calculating a phase angle as the sum of, for each of the k pilot symbols, the angle between a predetermined pilot symbol and a corresponding received pilot symbol of the data block, wherein N=kn;
    generating an error block of k symbols, wherein each symbol is the difference between:
        one of the k predetermined pilot symbols adjusted by the phase angle; and
        one of the corresponding k received pilot symbols;
    concatenating the error block with a zero block of k zero-value symbols;
    applying a Fourier transform to transform the concatenated error block and zero block to the frequency domain to generate a frequency-domain block of 2k symbols; and
    duplicating the frequency-domain block n times to generate a block of the error signal of 2N symbols.

* * * * *

UNITED STATES PATENT AND TRADEMARK OFFICE
CERTIFICATE OF CORRECTION

Page 1 of 1

PATENT NO. : 11,108,599 B1
APPLICATION NO. : 16/936098
DATED : August 31, 2021
INVENTOR(S) : Chuandong Li and Jianhong Ke It is certified that error appears in the above-identified patent and that said Letters Patent is hereby corrected as shown below:

In the Claims

In Column 18, Line 52 (Claim 1): "domain using one or more tape values based on a" should read -- domain using one or more tap values based on a --.

In Column 20, Line 13 (Claim 8): "adding the step-scaled signal to the taps values from the" should read -- adding the step-scaled signal to the tap values from the --.

Signed and Sealed this
Second Day of November, 2021

Drew Hirshfeld
*Performing the Functions and Duties of the
Under Secretary of Commerce for Intellectual Property and
Director of the United States Patent and Trademark Office*